United States Patent
Minato et al.

(10) Patent No.: US 10,479,233 B2
(45) Date of Patent: Nov. 19, 2019

(54) SEAT APPARATUS FOR VEHICLE

(71) Applicant: HONDA MOTOR CO., LTD., Minato-ku, Tokyo (JP)

(72) Inventors: Muneatsu Minato, Utsunomiya (JP); Hajime Ishihara, Utsunomiya (JP); Manabu Matsumoto, Utsunomiya (JP); Yosuke Nishimura, Sakura (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/881,978

(22) Filed: Jan. 29, 2018

(65) Prior Publication Data
US 2018/0229628 A1 Aug. 16, 2018

(30) Foreign Application Priority Data
Feb. 10, 2017 (JP) .................. 2017-023399

(51) Int. Cl.
*B60N 2/20* (2006.01)
*B60N 2/22* (2006.01)

(52) U.S. Cl.
CPC ........... *B60N 2/203* (2013.01); *B60N 2/2227* (2013.01); *B60N 2/2245* (2013.01)

(58) Field of Classification Search
CPC .................................................... B60N 2/203
See application file for complete search history.

(56) References Cited

U.S. PATENT DOCUMENTS

| | | | |
|---|---|---|---|
| 3,150,897 A | 9/1964 | Higley | |
| 5,322,341 A * | 6/1994 | Harrison | B60N 2/203 297/364 |
| 6,179,375 B1 * | 1/2001 | Lane | B60N 2/203 297/103 |
| 9,315,238 B2 * | 4/2016 | Neese | B63B 17/00 |
| 2002/0153756 A1 * | 10/2002 | Lane | B60N 2/203 297/447.3 |

(Continued)

FOREIGN PATENT DOCUMENTS

| | | | |
|---|---|---|---|
| CA | 2419236 A1 * | 2/2002 | ............... B60N 2/10 |
| EP | 0756960 | 2/1997 | |

(Continued)

OTHER PUBLICATIONS

Japanese Office Action for Japanese Patent Application No. 2017-023399 dated Sep. 4, 2018.

*Primary Examiner* — Timothy J Brindley
(74) *Attorney, Agent, or Firm* — Amin, Turocy & Watson LLP

(57) ABSTRACT

A seat apparatus for a vehicle includes a conversion mechanism that converts a disposition of a seatback between a normal position to a converted position, the normal position being a position at which the seatback is disposed at a rear section of the seat cushion and a sitting direction of an occupant is facing forward, the converted position being a position at which the seatback is disposed at a front section of the seat cushion and a sitting direction of an occupant is facing rearward, and a reclining mechanism that biases the seatback toward a neutral position at which the seatback stands upward and that reclines the seatback forward and rearward from the neutral position.

6 Claims, 11 Drawing Sheets

(56) References Cited

U.S. PATENT DOCUMENTS

| | | | | |
|---|---|---|---|---|
| 2003/0047974 A1* | 3/2003 | Tame | ............... | B60N 2/203 |
| | | | | 297/283.3 |
| 2005/0253433 A1* | 11/2005 | Brown | ............... | B60N 2/06 |
| | | | | 297/283.3 |
| 2006/0152056 A1* | 7/2006 | Beranek | ............ | B60N 2/203 |
| | | | | 297/341 |
| 2006/0175876 A1* | 8/2006 | Syrowick | .......... | B60N 2/0292 |
| | | | | 297/92 |
| 2014/0138991 A1* | 5/2014 | Deimen | ............ | B60N 2/203 |
| | | | | 297/101 |
| 2015/0076874 A1* | 3/2015 | Neese | ............... | A47C 7/40 |
| | | | | 297/188.08 |
| 2015/0258955 A1* | 9/2015 | Jayasuriya | ........ | B60R 22/023 |
| | | | | 297/353 |
| 2018/0072193 A1* | 3/2018 | Barbot | ............. | B60N 2/225 |

FOREIGN PATENT DOCUMENTS

| | | |
|---|---|---|
| JP | 35-028824 | 10/1960 |
| JP | 04-009862 | 3/1992 |
| JP | 04-014277 | 3/1992 |
| JP | 04-070558 | 6/1992 |
| JP | 2006-347322 | 12/2006 |
| JP | 2007-195582 | 8/2007 |

* cited by examiner

SEAT APPARATUS FOR VEHICLE

CROSS-REFERENCE TO RELATED APPLICATION

Priority is claimed on Japanese Patent Application No. 2017-023399, filed Feb. 10, 2017, the content of which is incorporated herein by reference.

BACKGROUND

Field of the Invention

The present invention relates to a seat apparatus for a vehicle.

Description of Related Art

In recent times, research on automatic driving of vehicles has been in progress. In technology related to automatic driving, there is a technology of performing automatic driving for drive assistance in certain road sections. In this regard, there is also a technology related to automatic driving of switching between a manual driving mode, in which a driver's driving operation is needed, and an automatic driving mode. During automatic driving, a situation where the direction of a driver's seat is changed to form a layout that faces a rear seat can be considered. A seat apparatus for a vehicle in which a seatback is able to be moved from a rear side of the seat to a front side of the seat and a sitting direction is able to be switched from a forward direction to a rearward direction is known (for example, see Japanese Utility Model, First Publication No. H04-70558). In this configuration, changing of a sitting direction is easier, even in the limited space in a passenger compartment, compared to a case in which a seat apparatus is horizontally rotated.

SUMMARY

However, like the configuration of the related art, when a seatback is moved forward and rearward to switch a sitting direction of an occupant, it is difficult to maintain a function of a reclining mechanism. Conventionally, a reclining mechanism biases a seatback in a forward inclination direction during unlocking. The seatback stops pivotal movement at a standing-up position that is inclined forward than a vertically standing-up position. When the sitting direction of an occupant is switched while moving the seatback and the reclining mechanism forward and rearward, reclining of the seatback at a predetermined angle or more is made impossible due to a mechanism configured to stop the pivotal movement of the seatback. Therefore, eliminating the mechanism configured to stop pivotal movement of the seatback may be one idea, however, in this case, the seatback will be biased to a reclining position when the reclining mechanism is unlocked, and the usability will become worse.

An aspect of the present invention is to provide a seat apparatus for a vehicle in which usability of a seatback is able to be improved in a state in which the seatback can be moved forward and rearward while switching a sitting direction of an occupant.

A seat apparatus for a vehicle according to the present invention employs the following configuration.

(1) A seat apparatus for a vehicle according to the present invention includes a seat cushion; a seatback standing upward from the seat cushion and that supports a back of a person sitting on the seat cushion; a conversion mechanism that converts a disposition of the seatback between a normal position to a converted position, the normal position being a position at which the seatback is disposed at a rear section of the seat cushion and a sitting direction of an occupant is facing forward, the converted position being a position at which the seatback is disposed at a front section of the seat cushion and a sitting direction of an occupant is facing rearward; and a reclining mechanism that biases the seatback toward a neutral position at which the seatback stands upward and that reclines the seatback forward and rearward from the neutral position.

According to the configuration of above mentioned (1), irrespective of whether a sitting direction of an occupant is switched while moving the seatback forward or rearward, the seatback can be reclined forward or rearward from the neutral position and the seatback is biased to the neutral position at which the seatback stands upward irrespective of whether the seatback is reclined forward or rearward. For this reason, irrespective of whether the sitting direction of the occupant is a forward direction or a rearward direction, the seatback can be sufficiently reclined. In addition, irrespective of whether the sitting direction of the occupant is the forward direction or the rearward direction, when the lock of the reclining mechanism is released, since the seatback is biased to the neutral position at which the seatback stands upward, it is possible to appropriately maintain the usability when the seatback is reclined.

(2) In the aspect of above mentioned (1), the reclining mechanism may include a biasing member disposed in a radial direction of a reclining shaft that is a shaft about which the seatback is pivoted when the seatback is disposed at the neutral position, a first end of the biasing member may be engaged with an eccentric section of the seatback detached from the reclining shaft and a second end of the biasing member may be engaged with a non-reclining member that reclinably support the seatback, and the biasing member may elongate when the seatback is reclined forward or rearward from the neutral position to accumulate a biasing force.

According to the configuration of above mentioned (2), since the biasing member disposed in the radial direction of the reclining mechanism when the seatback is disposed at the neutral position is provided and the biasing member elongates to accumulate a biasing force irrespective of whether the biasing member is reclined forward or rearward, the seatback can be biased to the neutral position at which the seatback stands upward irrespective of whether the sitting direction of the occupant is the forward direction or the rearward direction.

(3) In the aspect of above mentioned (1), the reclining mechanism may include a first spiral spring and a second spiral spring that apply biasing forces to the seatback in opposite directions with each other and the first spiral spring and second spiral spring may bias the seatback toward the neutral position, and may accumulate a biasing force in only one of the first spiral spring and second spiral spring when the seatback is reclined forward or rearward from the neutral position.

According to the configuration of above mentioned (3), since a pair of spiral springs configured to generate biasing forces in opposite directions with each other are provided and the spiral springs biases the seatback to the neutral position, and the biasing force is accumulated in only one of the first spiral spring and the second spiral spring during reclining of the seatback, the seatback can be biased to the neutral position during reclining irrespective of whether the sitting direction is the forward direction or the rearward direction.

(4) In the aspect of any one of above mentioned (1) to (3), the reclining mechanism may be able to adjust a reclining angle of the seatback and to lock the reclining of the seatback at the adjusted reclining angle, and the reclining mechanism may be further able to unlock the reclining when the seatback moves between the normal position and the converted position.

According to the configuration of above mentioned (4), when the seatback is moved between a forward backrest position and a rearward backrest position, it is not necessary to perform any actual action in order to return the seatback to the neutral position, the locking of the reclining of the seatback is automatically released and the seatback is returned to the neutral position. For this reason, an operation switching the sitting direction of the seatback while moving the seatback forward and rearward can be easily performed.

(5) In the aspect of any one of above mentioned (1) to (4), the seat apparatus may further include a locking mechanism that fix the seatback at the normal position and the converted position, and an unlocking operator that performs an unlocking operation of the locking mechanism, and the unlocking operator may be installed on an upper end of the seatback.

According to the configuration of above mentioned (5), irrespective of whether the sitting direction is the forward direction or the rearward direction, unlocking of the locking mechanism can be performed by the same operation on the unlocking operator.

According to the aspects of the present invention, it is possible to provide a seat apparatus for a vehicle in which usability of a seatback is able to be improved where a sitting direction of the occupant is made switchable while the seatback is moved forward and rearward.

DESCRIPTION OF EMBODIMENTS

Hereinafter, an embodiment of a vehicle control system, a vehicle control method, and a vehicle control program of the present invention will be described with reference to the accompanying drawings. In the embodiment, a vehicle control system is applied to an automatic driving vehicle. Here, there are levels in automatic driving. The level of automatic driving may be determined, for example, on a scale of whether the level is less than a predetermined reference or the predetermined reference or more. A case in which the level of automatic driving is less than a predetermined reference is, for example, a case in which manual driving is performed or a case in which only a drive assistance apparatus such as an adaptive cruise control system (ACC), a lane keeping assistance system (LKAS), or the like, is operated. A driving mode in which the level of automatic driving is less than a predetermined reference is an example of "a first driving mode." In addition, a case in which the level of automatic driving is a predetermined reference or more is, for example, a case in which a drive assistance apparatus such as automatic lane changing (ALC), low speed car passing (LSP) or the like, having a higher control level than that of ACC or LKAS is operated, or a case in which automatic driving is automatically performed for lane changing, merging or branching. A driving mode in which the level of automatic driving is a predetermined reference or more is an example of "a second driving mode." The predetermined reference may be arbitrarily set. In the embodiment, the first driving mode is manual driving, and the second driving mode is automatic driving.

[Entire Configuration]

Figure 1:
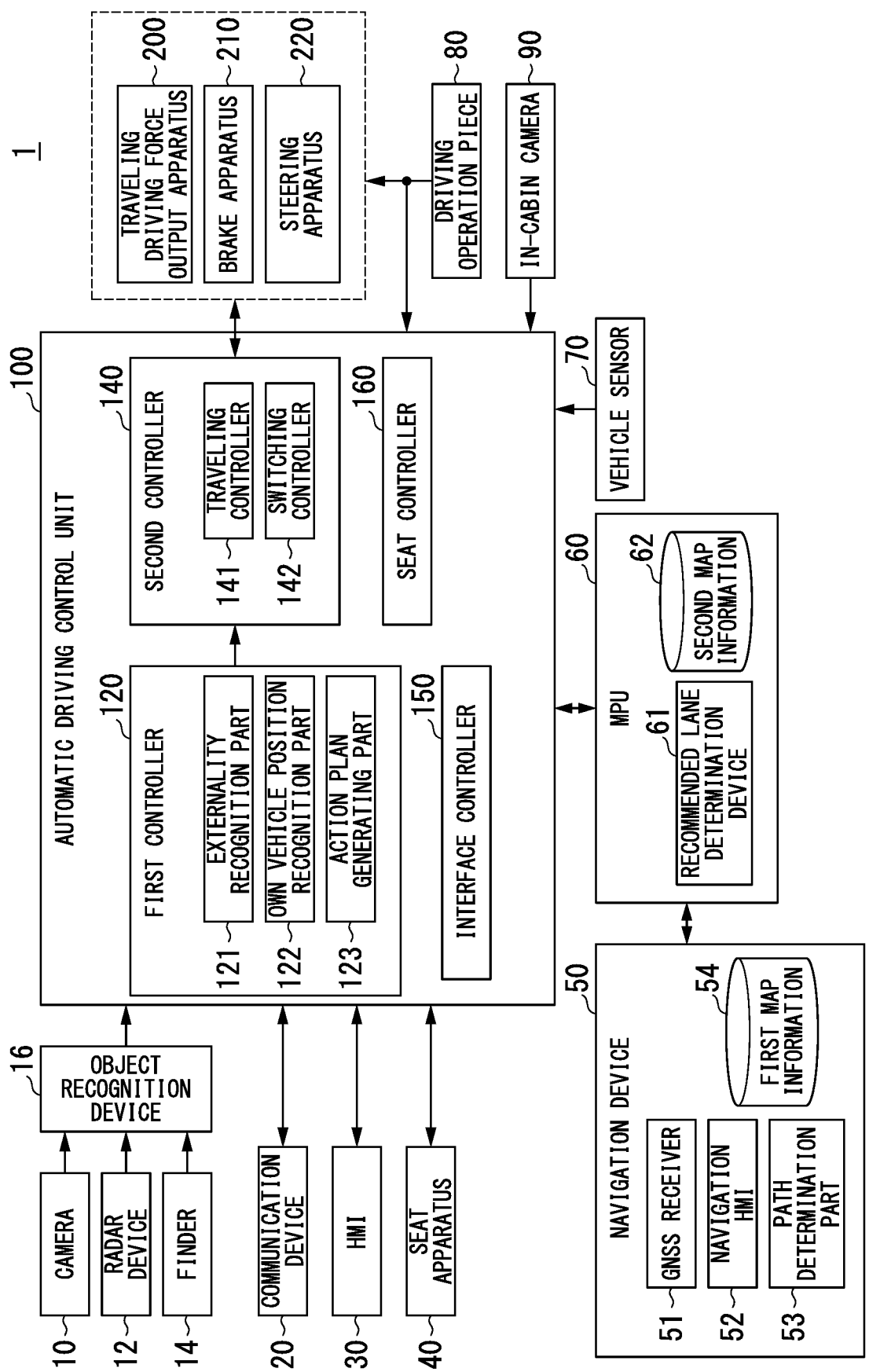
FIG. 1 is a configuration view of a vehicle system of an embodiment.

FIG. 1 is a configuration view of a vehicle system 1 of an embodiment. A vehicle on which the vehicle system 1 is mounted (hereinafter, referred to as a vehicle M) is, for example, a two-wheeled, three-wheeled, four-wheeled vehicle, or the like. A driving source thereof is an internal combustion engine such as a diesel engine, a gasoline engine, or the like, an electric motor, or a combination thereof. The electric motor is operated using an output generated by a generator connected to the internal combustion engine, or a discharge power of a secondary battery or a fuel cell.

The vehicle system 1 includes, for example, a camera 10, a radar device 12, a finder 14, an object recognition device 16, a communication device 20, a human machine interface (HMI) 30, a seat apparatus 40, a navigation device 50, a micro-processing unit (MPU) 60, a vehicle sensor 70, a driving operator 80, an in-cabin camera 90, an automatic driving control unit 100, a traveling driving force output apparatus 200, a brake apparatus 210 and a steering apparatus 220. These devices or instruments are connected to each other by a multiplex communication line such as a controller area network (CAN) communication line or the like, a serial communication line, a wireless communication network, or the like. Further, the configuration shown in FIG. 1 is merely an example, and a part of the configuration may be omitted or other configurational components may be added thereto.

"A vehicle control system" in a first embodiment includes, for example, the seat apparatus 40 and the automatic driving control unit 100.

The camera 10 is a digital camera using a solid-state image sensing device such as a charge coupled device (CCD), a complementary metal oxide semiconductor (CMOS), or the like. One or a plurality of cameras 10 are attached to arbitrary places on the vehicle M on which the vehicle system 1 is mounted. For imaging the front side, the camera 10 is attached to an upper section of a front windshield, a back surface of a rearview mirror, or the like. For imaging the rear side, the camera 10 is attached to an upper section of a rear windshield, a back door, or the like. For imaging the lateral sides, the camera 10 is attached to a door mirror or the like. The camera 10, for example, periodically repeats imaging of the surroundings of the vehicle M. The camera 10 may be a stereo camera.

The radar device 12 radiates radio waves such as millimeter waves to the surroundings of the vehicle M and detects the radio waves reflected by an object (reflected waves) to detect at least a position (a distance and an azimuth) of the object. One or a plurality of radar devices 12 are attached to arbitrary places on the vehicle M. The radar device 12 may detect a position and a speed of an object by using a frequency modulated continuous wave (FMCW) method.

The finder 14 is light detection and ranging or laser imaging detection and ranging (LIDAR) for measuring scattered light with respect to radiated light and detecting a distance to an object. One or a plurality of finders 14 are attached to arbitrary places on the vehicle M.

The object recognition device 16 performs sensor fusion processing with respect to the detection results using some or all of the camera 10, the radar device 12 and the finder 14, and recognizes a position, a type, a speed, and so on, of an object. The object recognition device 16 outputs the recognition results to the automatic driving control unit 100.

The communication device 20 communicates with another vehicle that is present around the vehicle M or communicates with various types of server device via a radio base station using, for example, a cellular network, a Wi-Fi network, Bluetooth (registered trade mark), dedicated short range communication (DSRC), or the like. In addition, the communication device 20 communicates with a terminal device carried by a person outside the vehicle.

The HMI 30 presents various types of information to an occupant in the vehicle and receives an input operation from the occupant. The HMI 30 may be, for example, various types of display device, a speaker, a buzzer, a touch panel, various types of operating switch, a key, or the like.

The seat apparatus 40 is a seat on which an occupant of the vehicle M sits, and a seat that can be electrically driven. The seat apparatus 40 includes a driver's seat on which a driver sits to manually drive the vehicle M using the driving operator 80, a passenger seat next to the driver's seat, a rear seat behind the driver's seat or the passenger seat, and so on. In the following description, "the seat apparatus 40" is assumed as the driver's seat. The seat apparatus 40 is operated under control by a seat controller 160, which will be described below. A specific configuration of the seat apparatus 40 will be described below.

The navigation device 50 includes, for example, a global navigation satellite system (GNSS) receiver 51, a navigation HMI 52 and a path determination part 53, and stores first map information 54 in a storage device such as a hard disk drive (HDD), a flash memory, or the like. The GNSS receiver identifies a position of the vehicle M on the basis of a signal received from a GNSS satellite. The position of the vehicle M may be identified or complemented by using an inertial navigation system (INS) using the output of the vehicle sensor 70. The navigation HMI 52 includes a display device, a speaker, a touch panel, a key, and so on. The navigation HMI 52 may be partially or entirely the same as the above-mentioned HMI 30. The path determination part 53 determines, for example, a route from a position of the vehicle M identified by the GNSS receiver 51 (or an input arbitrary position) to a destination input by an occupant using the navigation HMI 52 (for example, including information related to transit points when the vehicle travels to a destination) with reference to the first map information 54. The first map information 54 is, for example, information that expresses a road shape using a link showing a road and nodes connected by the link. The first map information 54 may also include information such as a curvature of a road, a point of interest (POI), or the like. The route determined by the path determination part 53 is output to the MPU 60. In addition, the navigation device 50 may perform route guidance using the navigation HMI 52 on the basis of the route determined by the path determination part 53. Further, the navigation device 50 may be realized by a function of a terminal device such as a smartphone, a tablet terminal, or the like, carried by a user. In addition, the navigation device 50 may transmit a current position and a destination to a navigation server via the communication device 20 and acquire a route returned from the navigation server.

The MPU 60 functions as, for example, a recommended lane determination device 61, and stores second map information 62 in a storage device such as a HDD, a flash memory, or the like. The recommended lane determination device 61 divides the route provided from the navigation device 50 into a plurality of blocks (for example, divides the route in every 100 [m] in a direction of travel of the vehicle), and determines a recommended lane for each block with reference to the second map information 62. The recommended lane determination device 61 determines the number of the lane from the left on which the vehicle travels. The recommended lane determination device 61 determines a recommended lane such that the vehicle M can travel on a reasonable traveling route to go to a branching destination when branching points, merging points, or the like, are present on the route.

The second map information 62 is map information that is more accurate than the first map information 54. The second map information 62 includes, for example, information of a center of the lane, information of a boundary of the lane, or the like. In addition, the second map information 62 may include road information, traffic regulations information, address information (address/zip code), facilities information, telephone number information, and so on. The road information includes information that indicating types of road such as an expressway, a toll road, a national road and a prefectural road, or information such as a lane number of the road, a region of an emergency parking area, a width of each lane, a slope of the road, a position (three-dimensional coordinates including a longitude, a latitude and a height) of the road, a curvature of a curve of the lane, positions of merging and branching points of lanes, signs installed on the road, and so on. The second map information 62 may be updated at any time through access to another apparatus using the communication device 20.

The vehicle sensor 70 includes a vehicle speed sensor configured to detect a speed of the vehicle M, an acceleration sensor configured to detect an acceleration, a yaw rate sensor configured to detect an angular speed around a vertical axis, an azimuth sensor configured to detect a direction of the vehicle M, and so on.

The driving operator 80 includes, for example, an acceleration pedal, a brake pedal, a shift lever, a steering wheel, and other operators. A sensor configured to detect an operation quantity or existence of an operation is attached to the driving operator 80, and the detection results thereof are output to the automatic driving control unit 100, the traveling driving force output apparatus 200, or one or both of the brake apparatus 210 and the steering apparatus 220.

The in-cabin camera 90 images, for example, an upper half of an occupant sitting on the seat apparatus 40 while having the face of the occupant around the center. The in-cabin camera 90, for example, periodically repeats imaging of the occupant. An image captured by the in-cabin camera 90 is output to the automatic driving control unit 100.

[Automatic Driving Control Unit]

The automatic driving control unit 100 includes, for example, a first controller 120, a second controller 140, an interface controller 150 and the seat controller 160. The first controller 120, the second controller 140, the interface controller 150 and the seat controller 160 are realized by a processor such as a central processing unit (CPU) or the like executing a program (software). In addition, some or all of functional units from the first controller 120, the second controller 140, the interface controller 150 and the seat controller 160, which will be described below, may be realized by hardware such as a large scale integration (LSI), an application specific integrated circuit (ASIC), a field-programmable gate array (FPGA), or the like, or may be realized by cooperation between software and hardware.

The first controller 120 includes, for example, an outside recognition part 121, an own vehicle position recognition part 122, and an action plan generating part 123.

The outside recognition part 121 recognizes a position and a vehicle speed of a neighboring vehicle, and a state such as an acceleration thereof, or the like, on the basis of information input from the camera 10, the radar device 12 and the finder 14 via the object recognition device 16. The position of a neighboring vehicle may be represented by a representative point such as a centroid, corners, or the like, of the neighboring vehicle, or may be represented by a region indicated by an outline of the neighboring vehicle. "The state" of a neighboring vehicle may include an acceleration or a jerk of a neighboring vehicle, or "an action state" (for example, whether or not lane changing is being performed, or about to be performed).

In addition, the outside recognition part 121 may recognize positions of a guard rail, an electric pole, a parked vehicle, a person such as a pedestrian or the like, and other objects, in addition to a neighboring vehicle.

The own vehicle position recognition part 122 recognizes, for example, a lane through on the vehicle M is traveling (a traveling lane), and a relative position and an attitude of the vehicle M with respect to the traveling lane. The own vehicle position recognition part 122 recognizes a traveling lane by, for example, comparing a pattern of road lane markings obtained from the second map information 62 (for example, arrangement of solid lines and broken lines) with a pattern of a road lane markings around the vehicle M recognized from an image captured by the camera 10. In this recognition, a position of the vehicle M acquired from the navigation device 50 or results of a process using an INS may be added.

Figure 2:
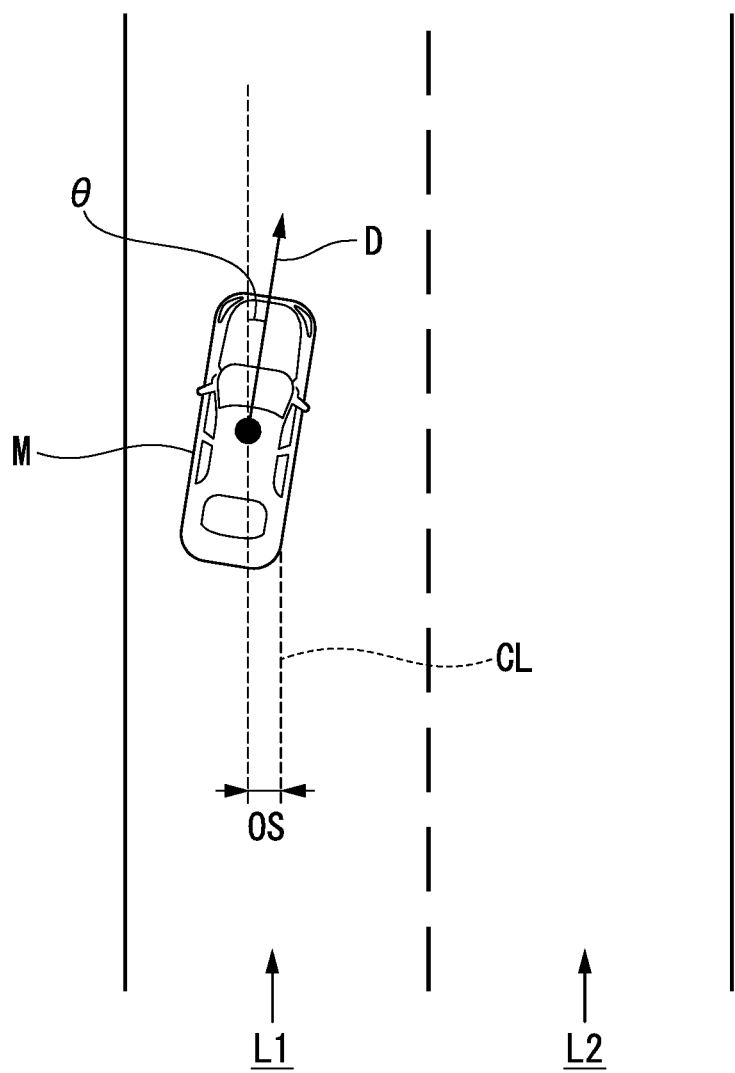
FIG. 2 is a view showing an aspect in which a relative position and an attitude of a vehicle with respect to a traveling lane are recognized by an own vehicle position recognition part.

Then, the own vehicle position recognition part 122 recognizes, for example, a position or an attitude of the vehicle M with respect to a traveling lane. FIG. 2 is a view showing an aspect in which a relative position and an attitude of the vehicle M with respect to a traveling lane L1 are recognized by the own vehicle position recognition part 122. The own vehicle position recognition part 122 recognizes, for example, a divergence OS of a reference point (for example, a center of gravity) of the vehicle M from a traveling lane center CL, and an angle θ between a traveling direction D of the vehicle M and a line continuing from the traveling lane center CL, as a relative position and an attitude of the vehicle M with respect to the traveling lane L1. Further, instead of this, the own vehicle position recognition part 122 may recognize a position of a reference point of the vehicle M or the like with respect to any one of side end portions of the traveling lane L1 as a relative position of the vehicle M with respect to the traveling lane. The relative position of the vehicle M recognized by the own vehicle position recognition part 122 is provided to the recommended lane determination device 61 and the action plan generating part 123.

The action plan generating part 123 generates an action plan causing the vehicle M to perform automatic driving with respect to the destination or the like. For example, the action plan generating part 123 may determine events that are sequentially executed in the automatic driving control such that the vehicle M travels in the recommended lane determined by the recommended lane determination device 61 and deals with circumstances around the vehicle M. Events in the automatic driving of the embodiment include, for example, a constant speed traveling event in which the vehicle M travels in the same traveling lane at a constant speed, a lane changing event of changing a traveling lane of the vehicle M, an overtaking event in which the vehicle M overtakes a preceding vehicle, a following traveling event in which the vehicle M travels by following a preceding vehicle, a merging event of causing a vehicle to merge at a merging point, a branching event in which the vehicle M travels in a desired direction at a branching point of a road, an emergency stop event of causing the vehicle M to make an emergency stop, a switching event of terminating automatic driving and switching automatic driving to manual driving, and so on. In addition, an action for avoidance may be planned on the basis of surrounding circumstances of the vehicle M (existence of neighboring vehicles or pedestrians, lane narrowing or the like due to road construction) during execution of these events.

The action plan generating part 123 generates a target trajectory on which the vehicle M will travel. The target trajectory includes, for example, a speed element. For example, a plurality of future reference times may be set at each of predetermined sampling times (for example, every several tenths of a [sec]), and the target trajectory may be generated as a set of target points (trajectory points) reached at these reference times. For this reason, this indicates that, when an interval between trajectory points is large, the vehicle M is traveling on a section between trajectory points at a high speed.

Figure 3:
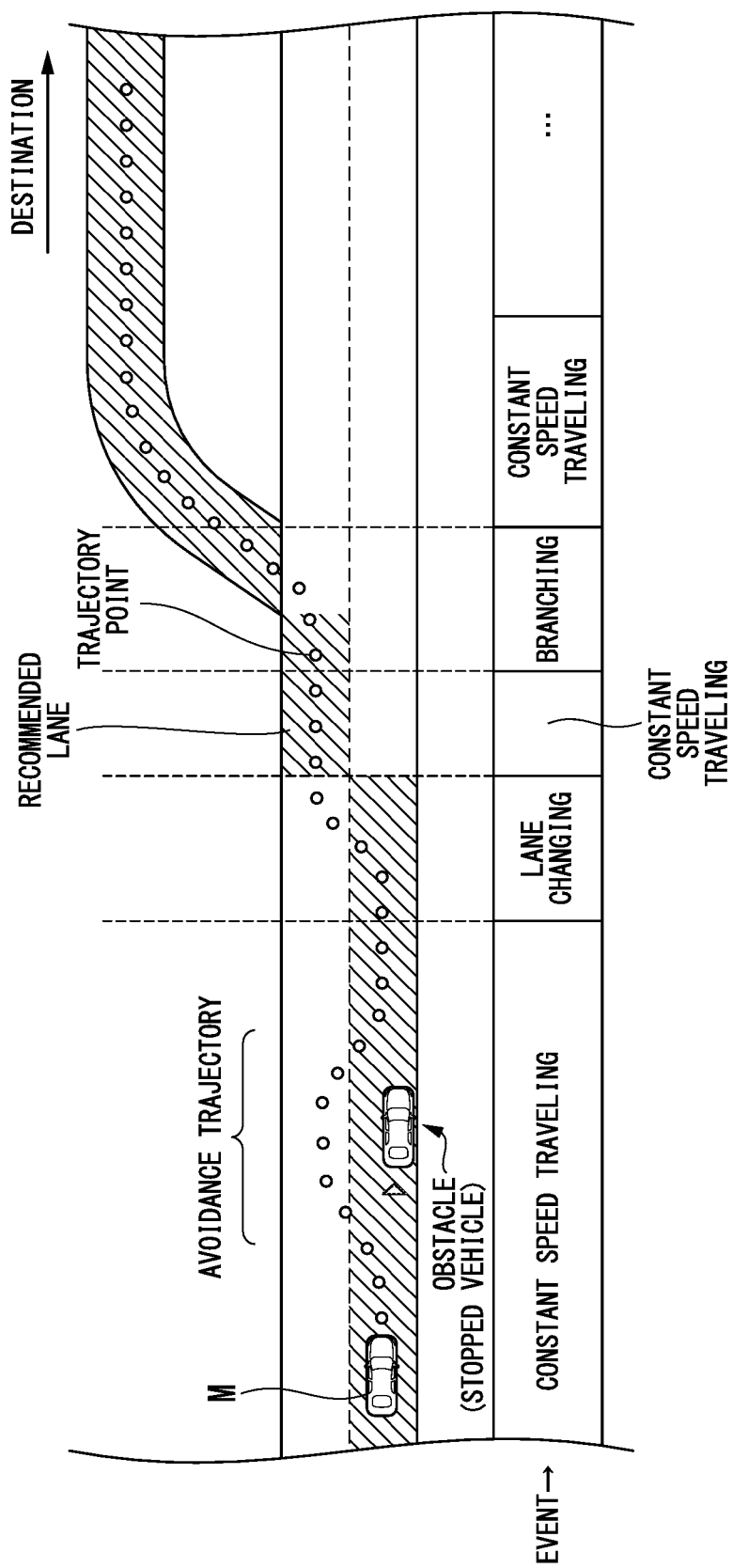
FIG. 3 is a view showing an aspect in which a target trajectory is generated on the basis of a recommended lane.

FIG. 3 is a view showing an aspect in which a target trajectory is generated on the basis of the recommended lane. As shown in FIG. 3, the recommended lane is set so that it is convenient for traveling to the destination along the route.

The action plan generating part 123 starts a lane changing event, a branching event, or a merging event and the like when the vehicle M reaches a predetermined distance before a recommended lane switching point (may be determined according to the type of event). When there is a need to avoid an obstacle during execution of one of these events, an avoidance trajectory is generated as shown in the drawing.

The action plan generating part 123 generates, for example, candidates for a plurality of target trajectories, and selects an optimal target trajectory appropriate for a route to a destination at that point of time from a viewpoint of safety and efficiency.

The second controller 140 includes, for example, a traveling controller 141 and a switching controller 142. The traveling controller 141 controls the traveling driving force output apparatus 200, the brake apparatus 210 and the steering apparatus 220 such that the vehicle M passes along the target trajectory generated by the action plan generating part 123 at scheduled times.

The switching controller 142 switches a driving mode of the vehicle M on the basis of the action plan generated by the action plan generating part 123. For example, the switching controller 142 may switch the driving mode from manual driving to automatic driving at an expected starting point of automatic driving. In addition, the switching controller 142 may switch the driving mode from automatic driving to manual driving at an expected termination point of automatic driving.

In addition, the switching controller 142 may switch between automatic driving and manual driving, for example, on the basis of a switching signal input from an automatic driving changeover switch included in the HMI 30. In addition, the switching controller 142 may switch the driving mode of the vehicle M from automatic driving to manual driving on the basis of an operation that instructs acceleration, deceleration or steering with respect to the driving operator 80 such as an accelerator pedal, a brake pedal, a steering wheel, or the like.

During manual driving, the input information from the driving operator 80 is directly output to the traveling driving force output apparatus 200, the brake apparatus 210 and the steering apparatus 220. In addition, the input information from the driving operator 80 may be output to the traveling driving force output apparatus 200, the brake apparatus 210 and the steering apparatus 220 via the automatic driving control unit 100. Electronic control units (ECUs) of the traveling driving force output apparatus 200, the brake apparatus 210 and the steering apparatus 220 perform operations thereof on the basis of the input information from the driving operator 80 or the like.

The interface controller 150 outputs a notification and the like regarding a traveling state during automatic driving or manual driving of the vehicle M, a timing when automatic driving and manual driving are switched between, a request or the like for causing an occupant to perform manual driving, and so on, to the HMI 30. In addition, the interface controller 150 may output information on control contents regarding the seat controller 160 to the HMI 30. In addition, the interface controller 150 may output the information received by the HMI 30 to the first controller 120 or the seat controller 160.

The seat controller 160 controls, for example, the seat apparatus 40 on the basis of the information received by the HMI 30, and further controls the seat apparatus 40 as described below when the driving mode is switched by the switching controller 142.

The traveling driving force output apparatus 200 outputs a traveling driving force (torque) for causing the vehicle to travel to the driving wheels. The traveling driving force output apparatus 200 includes, for example, a combination of an internal combustion engine, an electric motor, a transmission device, and so on, and an ECU configured to control them. The ECU controls the above-mentioned components according to the information input from the traveling controller 141 or information input from the driving operator 80.

The brake apparatus 210 includes, for example, a brake caliper, a cylinder configured to transmit a hydraulic pressure to the brake caliper, an electric motor configured to generate a hydraulic pressure in the cylinder, and a brake ECU. The brake ECU is configured to control the electric motor according to the information input from the traveling controller 141 or the information input from the driving operator 80, and to output a brake torque to the wheels according to a brake operation. The brake apparatus 210 may include a mechanism configured to transmit a hydraulic pressure generated by an operation of the brake pedal included in the driving operator 80 to the cylinder via a master cylinder as a back-up. Further, the brake apparatus 210 is not limited to the above-mentioned configurations, and may be an electronic control type hydraulic brake apparatus configured to control an actuator according to information input from the traveling controller 141 or information input from the driving operator 80 and transmit a hydraulic pressure of the master cylinder to the cylinder. In addition, the brake apparatus 210 may include a plurality of brake device systems in consideration of safety.

The steering apparatus 220 includes, for example, a steering ECU and an electric motor.

The electric motor applies, for example, a force to a rack and pinion mechanism and changes a direction of the steered wheels. The steering ECU drives the electric motor and changes the direction of the steered wheels according to the information input from the traveling controller 141 and the information input from the driving operator 80.

[Configuration and Control of Seat Apparatus 40]

Hereinafter, a configuration of the seat apparatus 40 of the embodiment and control of the seat apparatus 40 by the seat controller 160 will be described.

Figure 4A:
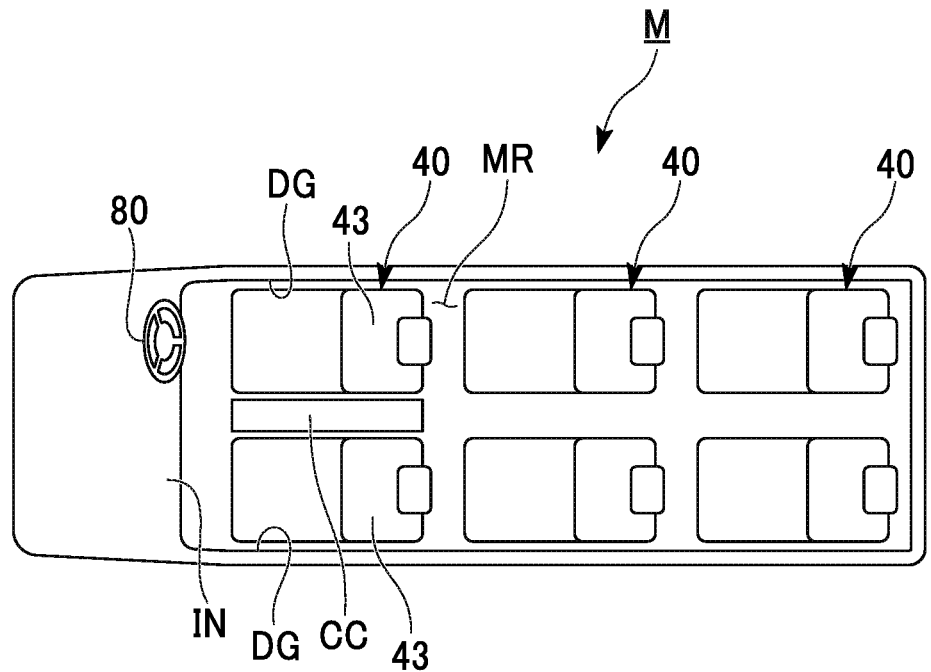
FIG. 4A is a plan view showing a seat layout of a vehicle of the embodiment.
Figure 4B:
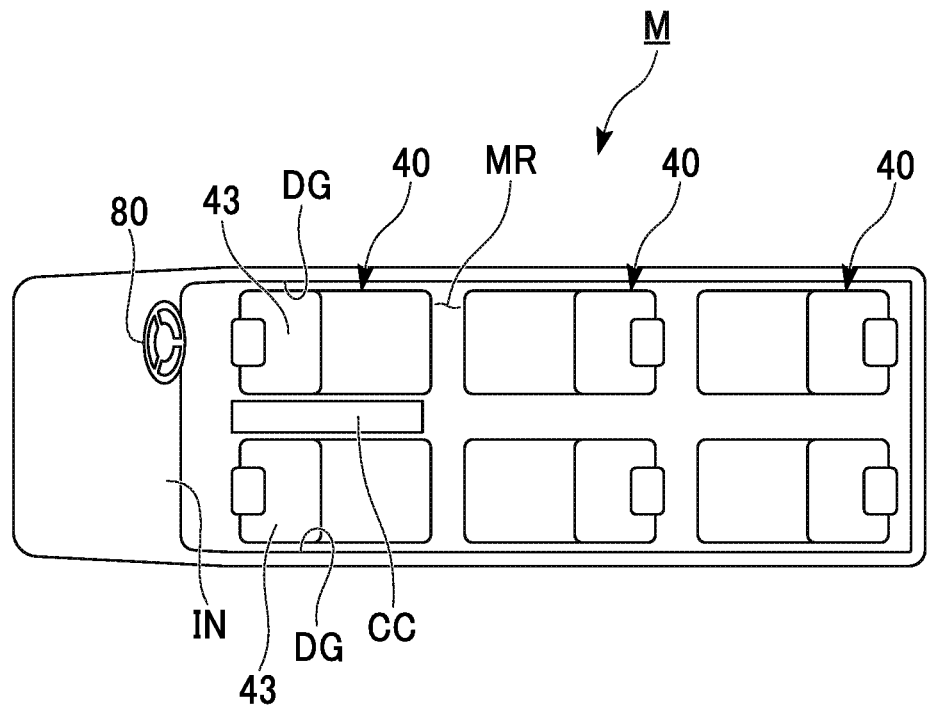
FIG. 4B is a plan view showing the seat layout of the vehicle of the embodiment.

As shown in FIGS. 4A and 4B, the vehicle M includes a plurality of front and rear rows of seat apparatuses 40 (in an example in the drawings, three rows) in a passenger compartment MR. One of the seat apparatuses 40 of the foremost row is a driver's seat on which a driver sits to manually drive the vehicle M using the driving operator 80, and is in a forwardly facing state (see FIG. 4A) in which the seat apparatus 40 is directed toward a front side of the vehicle during manual driving traveling. Meanwhile, in the seat apparatus 40 that is a driver's seat, a seatback 43 is movable forward during automatic driving traveling and is able to be changed to a state facing a rear side of the vehicle (see FIG. 4B). Further, like the driver's seat, in the seat apparatus 40 of a passenger seat, the seatback 43 is movable forward. In addition, the vehicle is not limited to a vehicle having three rows of seats. Reference symbol IN in the drawings designates an installment panel, reference symbol CC designates a center console, and reference symbol DG designates a door garnish.

Figure 5:
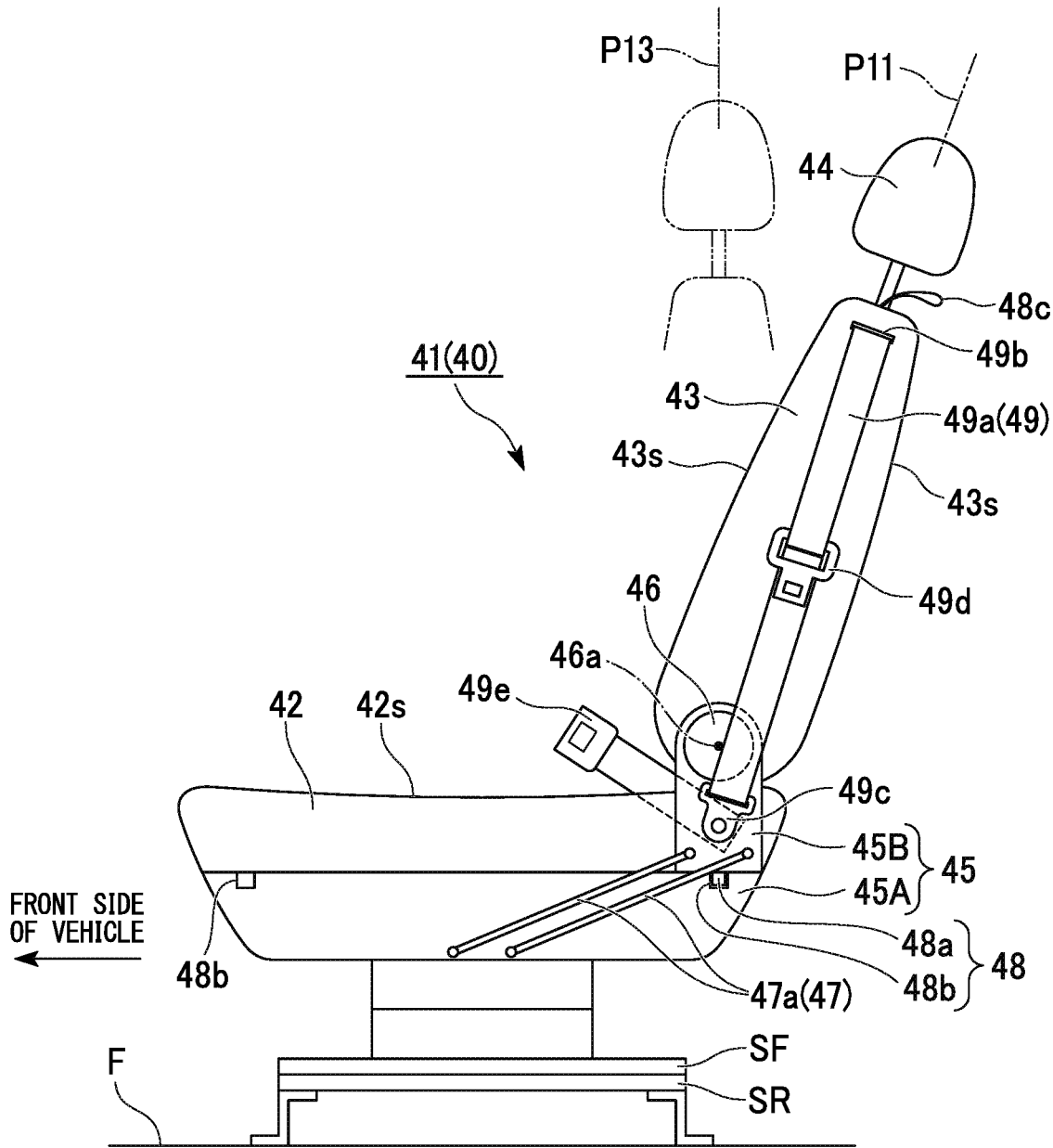
FIG. 5 is a side view of a seat apparatus of the embodiment, showing a forwardly facing state in which a seatback is disposed on a rear seat section.

As shown in FIG. 5, the seat apparatus 40 of the embodiment includes a slide rail SR extending in a vehicle forward/rearward direction (in the drawing, in a leftward/rightward direction) and fixed onto a floor F of the vehicle body, a slide frame SF guided by the slide rail SR and that slides in the vehicle forward/rearward direction, and a seat main body 41 mounted on the slide frame SF.

The seat main body 41 includes a base frame 45 mounted on the slide frame SF, a seat cushion 42, the seatback 43 and a head rest 44. The seat cushion 42 is supported on the base frame 45, and supports the buttocks of an occupant, who sits on the seat, by a seating surface 42s from below. The seatback 43 is supported by the rear section of the base frame 45 and stands up above the rear section of the seat cushion 42, and the back of the occupant, who sits on the seat, is supported by the backrest surface 43s from behind.

Figure 6:
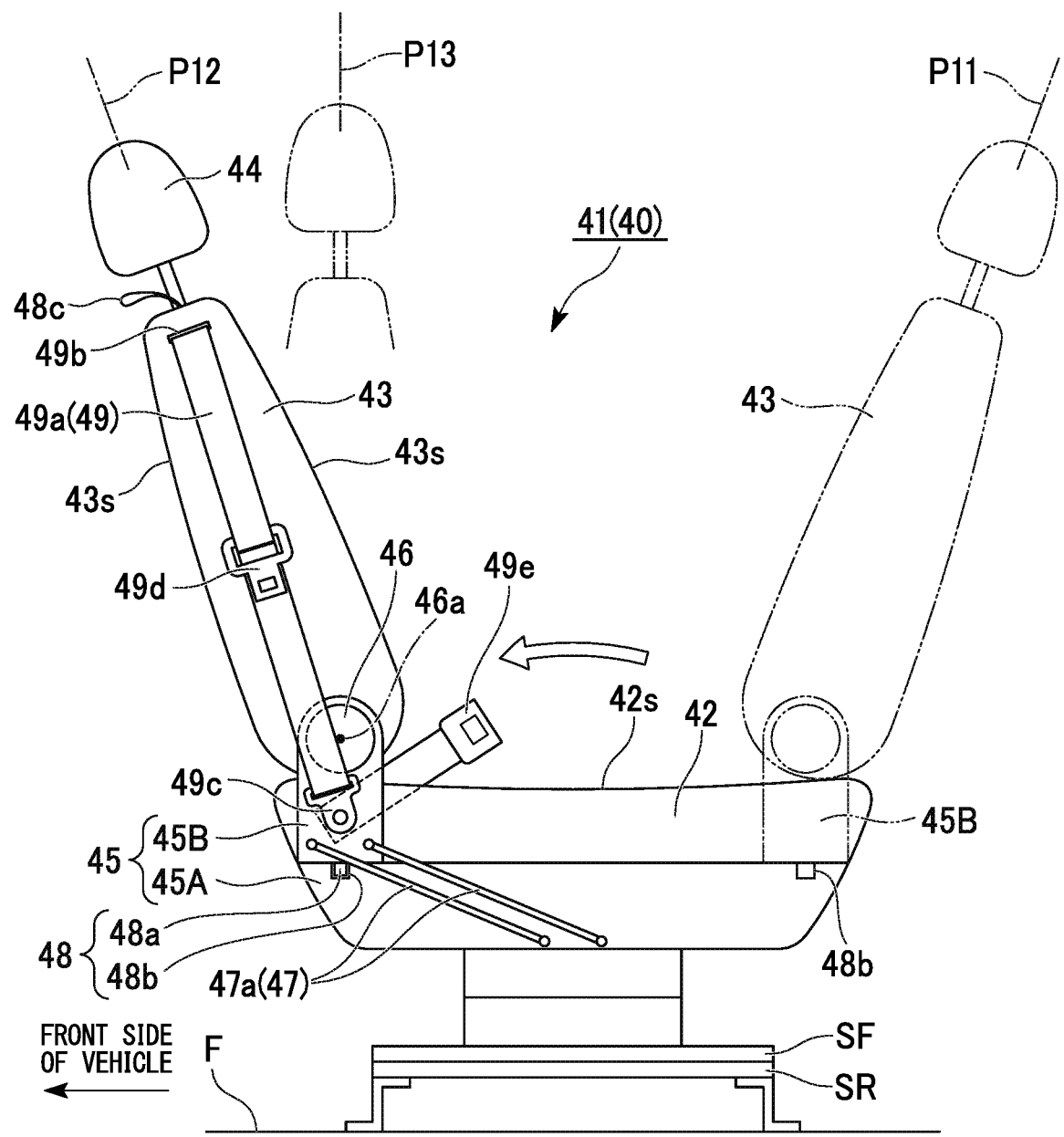
FIG. 6 is a side view of the seat apparatus of the embodiment, showing a rearwardly facing state in which the seatback is disposed on a front seat section.

Referring also to FIG. 6, the seatback 43 of the embodiment can change a sitting direction of an occupant from a forward direction to a rearward direction while moving the seatback 43 from the rear seat section to the front seat section, and both of front and rear surfaces can serve as the backrest surface 43s. The head rest 44 is supported above the seatback 43, and the head of the occupant, who sits on the seat, is supported from behind.

Both sides of a lower end portion of the seatback 43 in a standing state are supported at left and right rear sections of the base frame 45 via a reclining mechanism 46. The reclining mechanism 46 supports the seatback 43 on the base frame 45 such that the seatback 43 is pivotable (reclinable) about a support shaft (a reclining shaft 46a) extending in the vehicle leftward/rightward direction. The reclining mechanism 46 can change an inclination angle of the seatback 43 in a plurality of stages from a state in which the seatback 43 is substantially standing vertically to a state in which the seat back 43 is inclined rearward substantially horizontally.

The reclining mechanism 46 includes biasing members (a coil spring 46b, and spiral springs 46c and 46d, which will be described below) configured to bias the seatback 43 toward a neutral position P13, which will be described below). One of the left and right reclining mechanisms 46 includes a release lever (not shown) configured to release a fixed state of the inclination angle. When the fixing of the inclination angle of the reclining mechanism 46 is released, the seatback 43 is pivoted toward the neutral position P13 by a biasing force of the biasing member.

The base frame 45 and the reclining mechanism 46 are covered by, for example, a resin cover at a side surface of the seat main body 41.

The base frame 45 is divided into a frame main body 45A configured to support the seat cushion 42, and a back support frame 45B configured to form both sides of the rear section of the base frame 45 and configured to support the seatback 43 via the reclining mechanism 46. The back support frame 45B, the seatback 43, and so on, are displaceable to a converted position P12, which is positioned in a front section of the seat and in which a sitting direction of an occupant is facing rearward, from a normal position P11, which is positioned in a rear section of the seat and in which a sitting direction of an occupant is facing forward, by moving forward from the normal position P11. When the seatback 43, the reclining mechanism 46 and the back support frame 45B are disposed at the normal position P11, the seatback 43 is in a state in which an occupant is sitting forward to drive the vehicle (hereinafter, referred to as a forward use state).

When the back support frame 45B, the seatback 43, and so on, are disposed at the normal position P11 and the converted position P12, the back support frame 45B and the frame main body 45A are connected integrally to each other by a frame connecting mechanism 48 (a locking mechanism). The frame connecting mechanism 48 includes a connecting mechanism main body 48a installed on the seatback 43, and a striker 48b installed on the frame main body 45A to correspond to the normal position P11 and the converted position P12. The frame connecting mechanism 48 switches between a frame moving locked state in which movement of the back support frame 45B from the normal position P11 to the converted position P12 is restricted and a frame moving unlocked state in which the restriction is released. The frame connecting mechanism 48 can be maintained in the frame moving locked state during manual driving traveling, and can be brought into the frame moving unlocked state according to an unlocking operation during automatic driving traveling. The seat controller 160 can detect that the back support frame 45B is disposed at the normal position P11 (the seatback 43 is in a forward use state) from the state of the frame connecting mechanism 48.

The seat apparatus 40 includes a conversion mechanism 47 configured to move the back support frame 45B, the seatback 43, and so on, from the rear seat section to the front seat section and switch a sitting direction of an occupant from the forward direction to the rearward direction. The conversion mechanism 47 moves the seatback 43 to the normal position P11 at which the seatback 43 is disposed on the rear section of the seat cushion 42 and a sitting direction of an occupant is facing forward, and the converted position P12 at which the seatback 43 is disposed on the front section of the seat cushion 42 and a sitting direction of an occupant is facing rearward.

The reclining mechanism 46 biases the seatback 43 such that the seatback 43 stands up in a vertical direction. The seatback 43 stands up such that the head rest 44 is disposed directly above the reclining shaft 46a due to the biasing force. The position of the seatback 43 at this time is set as the neutral position P13. The reclining mechanism 46 can bias the seatback 43 toward the neutral position P13 and recline the seatback 43 from the neutral position P13 toward forward and rearward sides.

Hereinafter, a first embodiment of the biasing member of the reclining mechanism 46 will be described.

Figure 7A:
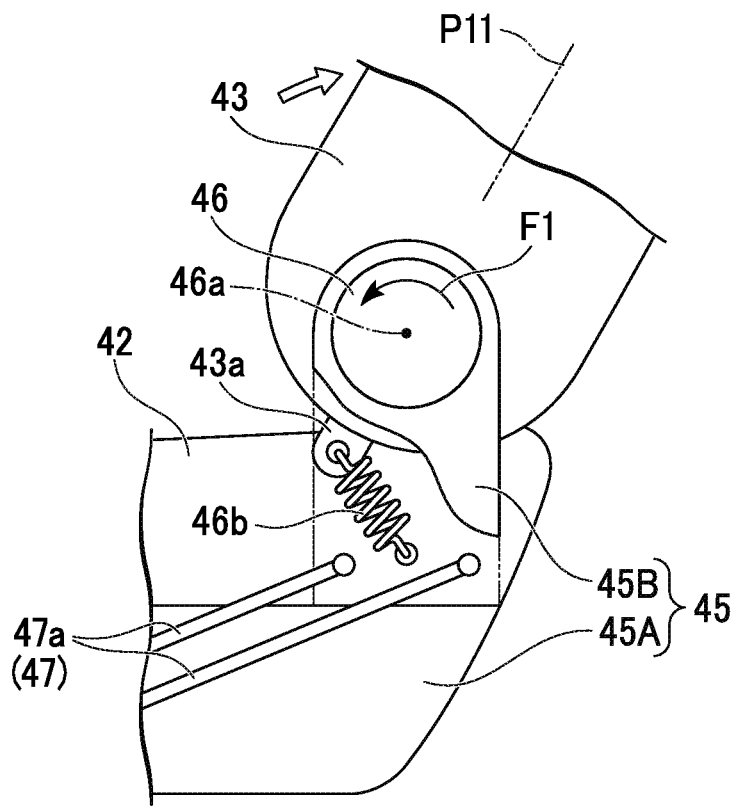
FIG. 7A is a side view showing a reclining mechanism of a first embodiment.
Figure 7B:
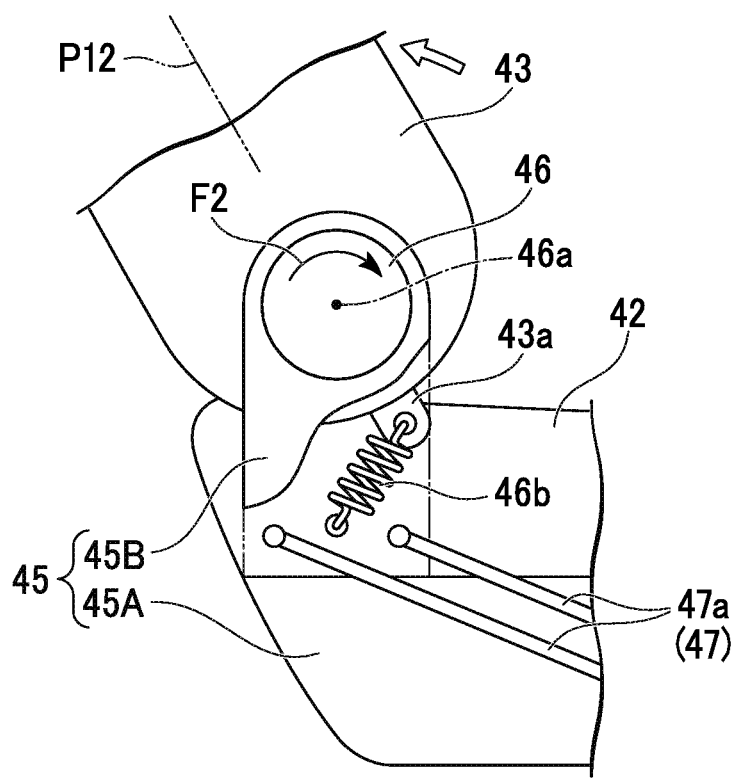
FIG. 7B is a side view showing the reclining mechanism of the first embodiment.
Figure 7C:
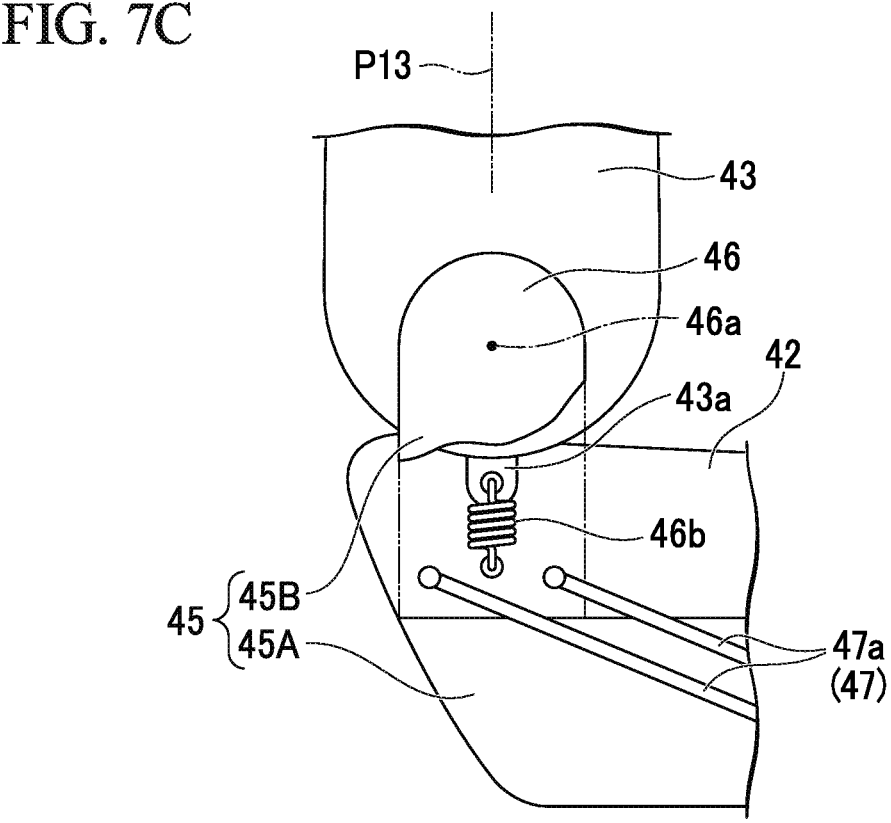
FIG. 7C is a side view showing the reclining mechanism of the first embodiment.

As shown in FIGS. 7A, 7B and 7C, the reclining mechanism 46 includes a tension coil spring (hereinafter, simply referred to as a coil spring 46b) as a biasing member configured to bias the seatback 43.

As shown in FIG. 7C, the coil spring 46b is disposed in a radial direction of the reclining shaft 46a when the seatback 43 is disposed at the neutral position P13. The coil spring 46b is disposed such that both ends of the coil spring 46b and the reclining shaft 46a are arranged in a straight line. In this state, a biasing force in a rotation direction by the coil spring 46b does not occur.

One end of the coil spring 46b is engaged with an eccentric section 43a of the seatback 43 (or a member reclined integrally with the seatback 43) separated from the reclining shaft 46a. In the seatback 43 positioned at the neutral position P13, the eccentric section 43a protrudes from, for example, a lower end portion of the seatback 43 below the reclining shaft 46a. The other end of the coil spring 46b is engaged with a non-reclining member (in the embodiment, the base frame 45) configured to reclinably support the seatback 43. When the seatback 43 is disposed at the neutral position P13, the coil spring 46b is disposed so as to extend downward vertically from the eccentric section 43a of the lower end of the seatback 43 and to reach the base frame 45.

As shown in FIG. 7A, when the seatback 43 moved to the rear section of the seat is pivoted rightward (reclining side, clockwise) in the drawing, the eccentric section 43a is moved from a position directly below the reclining shaft 46a clockwise in the drawing and the coil spring 46b is elongated. According to this elongation, a counterclockwise biasing force in the drawing (an arrow F1 in the drawing) is accumulated in the coil spring 46b for returning the seatback 43 to the neutral position P13.

As shown in FIG. 7B, when the seatback 43 moved to the front section of the seat is pivoted leftward (a reclining side, counterclockwise) in the drawing, the eccentric section 43a is moved from a position directly below the reclining shaft 46a counterclockwise in the drawing and the coil spring 46b is elongated. According to this elongation, a clockwise biasing force in the drawing (an arrow F2 in the drawing) is accumulated in the coil spring 46b for returning the seatback 43 to the neutral position P13.

In this way, since the coil spring 46b disposed in the radial direction of the reclining mechanism 46 when the seatback 43 is disposed at the neutral position P13 is provided and the coil spring 46b is elongated to accumulate a biasing force irrespective of whether the seatback 43 is reclined forward or rearward, the seatback 43 can be biased toward the neutral position P13 at which the seatback 43 stands upward regardless of whether a sitting direction of an occupant is facing forward or rearward.

Next, a second embodiment of the biasing member of the reclining mechanism 46 will be described.

Figure 8:
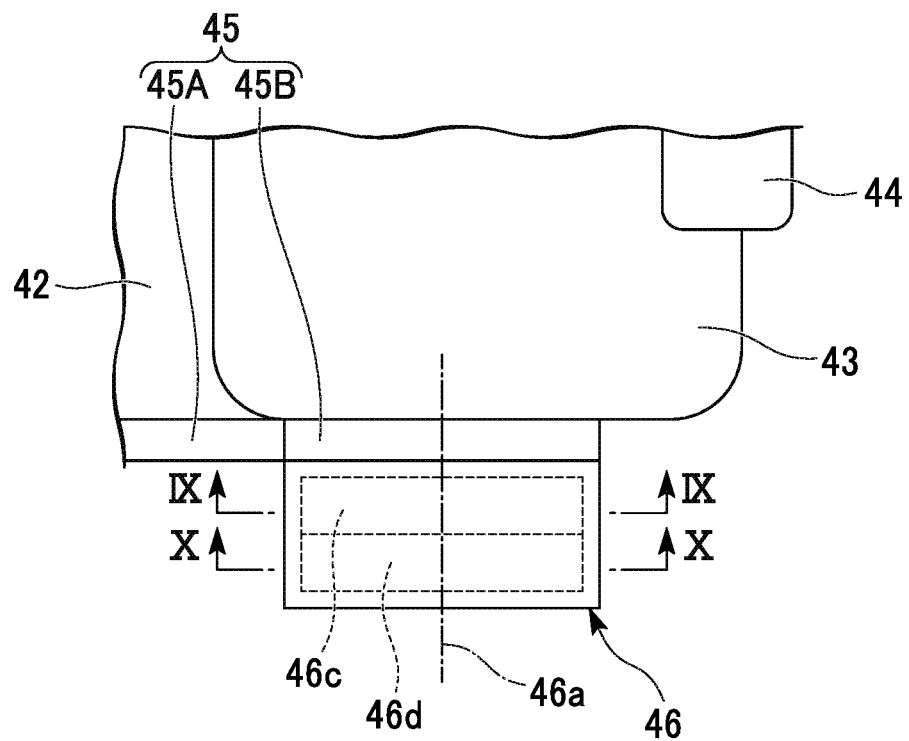
FIG. 8 is a plan view showing a reclining mechanism of a second embodiment.
Figure 9:
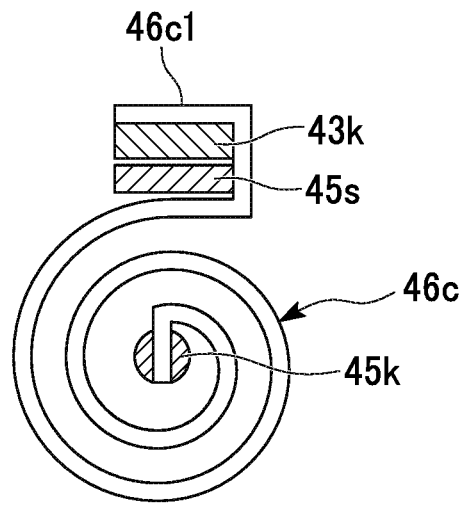
FIG. 9 is a cross-sectional view taken along line IX-IX in FIG. 8.
Figure 10:
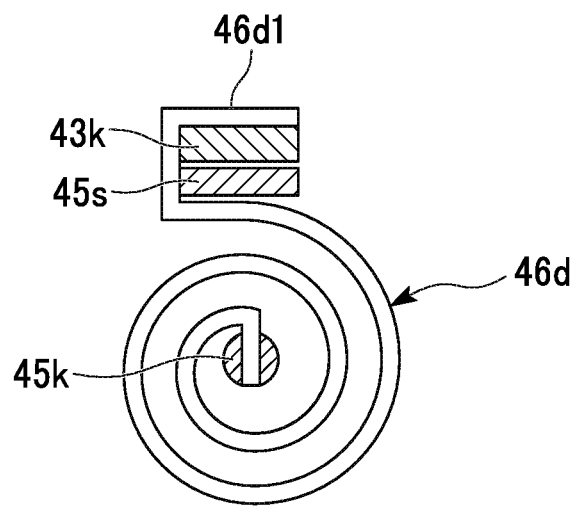
FIG. 10 is a cross-sectional view taken along line X-X in FIG. 8.

As shown in FIG. 8 to FIG. 10, the reclining mechanism 46 includes a first spiral spring 46c and a second spiral spring 46d serving as biasing members of the seatback 43 and configured to generate biasing forces in opposite directions with each other. The first spiral spring 46c and the second spiral spring 46d are a pair of spiral springs arranged substantially coaxially in a direction of the reclining shaft 46a, and are formed in vortex shapes in opposite directions when seen in the axial direction. The first spiral spring 46c and the second spiral spring 46d are disposed to overlap each other, for example, at one side in a seat width direction. Further, the first spiral spring 46c and the second spiral spring 46d are not limited to a configuration of being disposed on one side in the seat width direction and may be disposed to be divided on both sides in the seat width direction.

Center coil end portions of the first spiral spring 46c and the second spiral spring 46d are fixed to a spring fixing section 45k of the base frame 45 that is a non-reclining member. Outer circumferential locking sections 46c1 and 46d1 folded in substantially a U shape are formed on outer circumferential coil end portions of the first spiral spring 46c and the second spiral spring 46d. A spring locking section 43k of the seatback 43, which is a reclining member, and a stopper section 45s of the base frame 45 are locked to each of the outer circumferential locking sections 46c1 and 46d1 of the first spiral spring 46c and the second spiral spring 46d. The spring locking section 43k and the stopper section 45s are detachably attached to U-shaped opening sides of the outer circumferential locking sections 46c1 and 46d1. The spring locking section 43k can deflect the first spiral spring 46c and the second spiral spring 46d and accumulate a biasing force by pressing U-shaped bottom sides of the outer circumferential locking sections 46c1 and 46d1 in a pivoting direction.

Figure 11A:
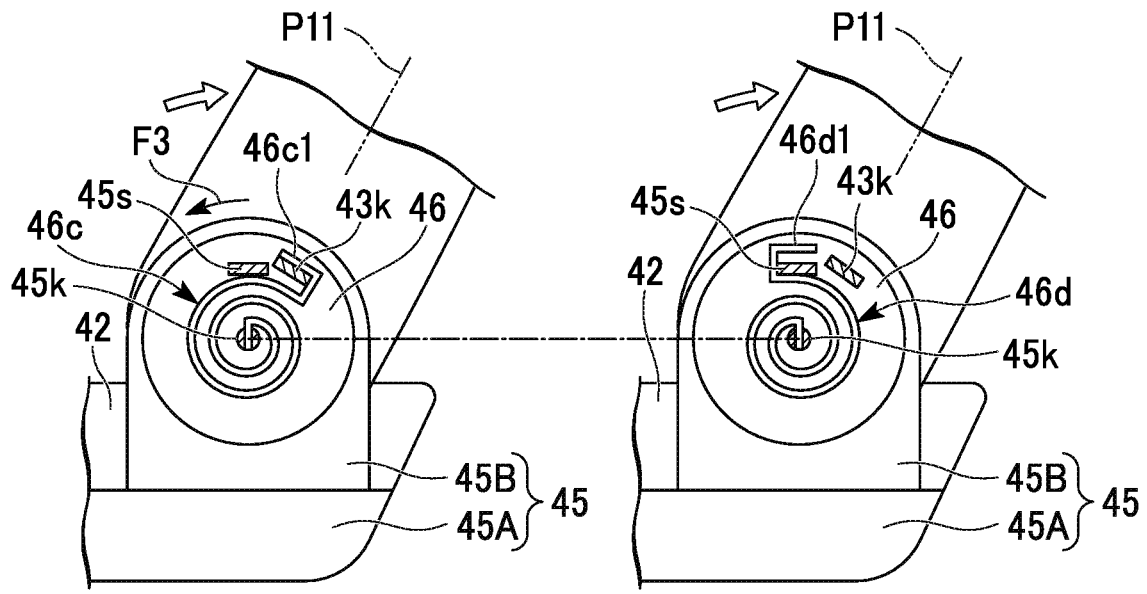
FIG. 11A is a side view showing the reclining mechanism of the second embodiment.

As shown in FIG. 11A, when the seatback 43 moved to the rear section of the seat is pivoted rightward (a reclining side, clockwise) in the drawing, in the first spiral spring 46c, the spring locking section 43k moves the outer circumferential locking section 46c1 to deflect the first spiral spring 46c. According to the deflection, a counterclockwise biasing force in the drawing (an arrow F3 in the drawing) is accumulated in the first spiral spring 46c in order to make the seatback 43 return to the neutral position P13. Meanwhile, in the second spiral spring 46d, only the spring locking section 43k is detached from the outer circumferential locking section 46d1, movement of which is restricted by the stopper section 45s.

Figure 11B:
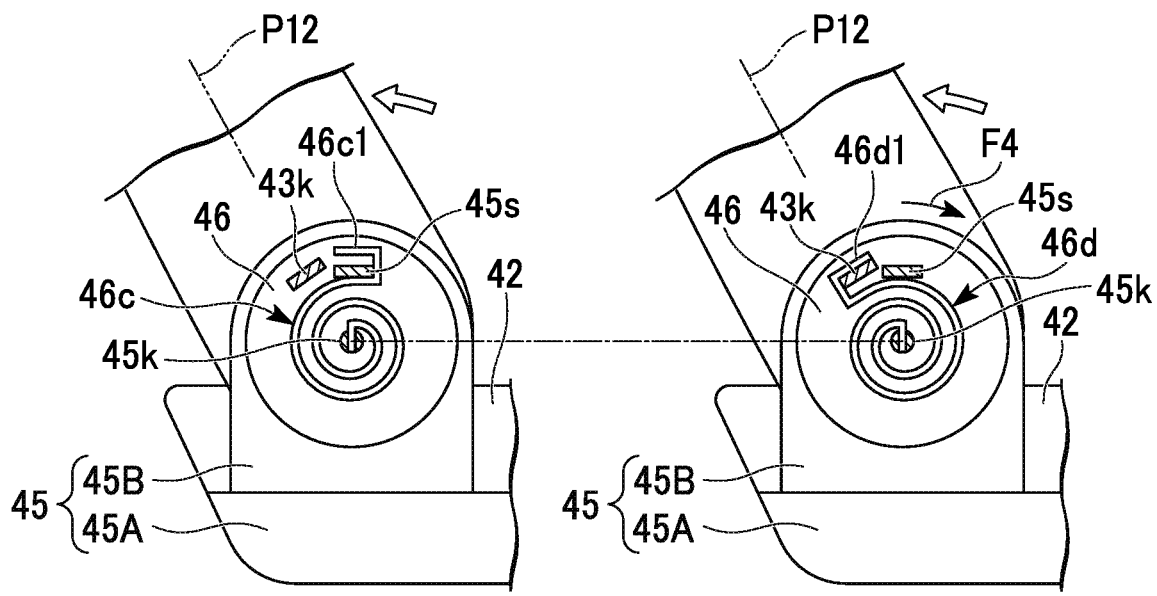
FIG. 11B is a side view showing the reclining mechanism of the second embodiment.

As shown in FIG. 11B, when the seatback 43 moved to the front section of the seat is pivoted leftward (a reclining side, counterclockwise) in the drawing, in the second spiral spring 46d, the spring locking section 43k moves the outer circumferential locking section 46d1 to deflect the second spiral spring 46d. According to the deflection, a clockwise biasing force in the drawing (an arrow F4 in the drawing) is accumulated in the second spiral spring 46d in order to make the seatback 43 return to the neutral position P13. Meanwhile, in the first spiral spring 46c, only the spring locking section 43k is detached from the outer circumferential locking section 46c1, movement of which is restricted by the stopper section 45s.

In this way, the first spiral spring 46c and the second spiral spring 46d capable of applying biasing forces to the seatback 43 in opposite directions are provided, and the first spiral spring 46c and the second spiral spring 46d bias the seatback 43 toward the neutral position P13. In addition, irrespective of whether the seatback 43 is reclined forward or rearward from the neutral position P13, a biasing force is accumulated in only one of the first spiral spring 46c and the second spiral spring 46d. Accordingly, irrespective of whether a sitting direction of an occupant is a forward direction or a rearward direction, the seatback 43 can be biased to the neutral position P13 during reclining.

In addition, the seatback 43 can be biased to the neutral position P13 by applying initial deflection to the first spiral spring 46c and the second spiral spring 46d. That is, release of the biasing force by the initial deflection of the first spiral spring 46c and the second spiral spring 46d is restricted by the stopper section 45s. While the spring locking section 43k deflects one of the first spiral spring 46c and the second spiral spring 46d when the seatback 43 is pivoted, the spring locking section 43k is detached from the other one and does not receive a biasing force in an opposite direction. For this reason, in particular, a biasing direction of the seatback 43 in the vicinity of the neutral position P13 can be clarified without a decrease in the biasing force for returning the seatback 43 to the neutral position P13 due to an influence of the biasing force in the opposite direction.

Returning to FIG. 5, the conversion mechanism 47 has a parallel link shape when seen in a side view. The conversion mechanism 47 includes a pair of link members 47a disposed substantially parallel to each other when seen in a side view. The link members 47a extends from the rear section of the frame main body 45A toward the lower section of the back support frame 45B which is disposed at the normal position P11, and is inclined rearward and upward so that a part closer to the rear end is positioned more upward. Both end portions of the link members 47a are connected to the frame main body 45A and the back support frame 45B to be axially pivotable in the vehicle width direction.

As shown in FIG. 6, the back support frame 45B is guided to each of the link members 47a and moves from the normal position P11 to the converted position P12 in front of the normal position P11. Here, the back support frame 45B moves in a substantially parallel manner while describing an arc-shaped trajectory when seen in a side view, and is displaced to the converted position P12. When the back support frame 45B is moved to the converted position P12, the link members 47a extends in an inclined manner so that a part closer to the front end is positioned more upward.

The seatback 43 and the reclining mechanism 46 also move similarly to the movement of the back support frame 45B. That is, the conversion mechanism 47 moves the seatback 43 forward and rearward as a whole.

During movement of the back support frame 45B, the reclining mechanism 46 releases the fixing of the inclination angle without requiring an operation of the release lever. Accordingly, during movement of the back support frame 45B, the seatback 43 is returned to the neutral position P13 by the biasing force of the reclining mechanism 46. A reclining direction of the seatback 43 is reversed according to whether the seatback 43 is disposed at the normal position P11 or disposed at the converted position P12. For this reason, the inclination angle of the seatback 43 needs to be changed when the seatback 43 is moved between the normal position P11 and the converted position P12 if the seatback 43 is used as a backrest. Here, an operation when a sitting direction of an occupant is switched can be easily performed by releasing the fixing of the inclination angle of the seatback 43 without operating the release lever, and by returning the seatback 43 to the neutral position P13.

The vehicle M includes a three-point type seat belt apparatus 49. The seat belt apparatus 49 includes a retractor (not shown) disposed inside of the seatback 43 and outer sides of the seatback 43 in the vehicle width direction and configured to wind a webbing 49a configured to restrict a person sitting on the seat. The webbing 49a unrolled from the retractor is drawn upward from a through-hole 49b of the upper end of the seatback 43. The webbing 49a extracted from the through-hole 49b is folded back downward at an outside of the seatback 43 in the vehicle width direction, and extends downward along an outer side surface of the seatback 43. A tip portion of the webbing 49a is fixed to an outer side of the back support frame 45B in the vehicle width direction via an outer anchor 49c. A tongue plate 49d passing through the webbing 49a is disposed between the through-hole 49b and the outer anchor 49c. The tongue plate 49d is detachably attached to a buckle 49e supported inside the back support frame 45B in the vehicle width direction.

The seat apparatus 40 includes an operation strap 48c serving as an unlocking operator configured to convert the frame connecting mechanism 48 to a frame moving unlocked state and protruding from an upper end of the seatback 43 outward in the vehicle width direction. The operation strap 48c converts the frame connecting mechanism 48 to the frame moving unlocked state when a pulling operation is performed to extract the seatback 43 against the biasing force. Accordingly, the seatback 43 can move between the normal position P11 and the converted position P12. An operation of pulling the operation strap 48c against the biasing force is an unlocking operation of the frame connecting mechanism 48. The unlocking operation of the operation strap 48c is ineffective (stopped or omitted) during manual driving traveling, and effective during automatic driving traveling.

Since the operation strap 48c protrudes from an upper end of the seatback 43, a person sitting on the seat apparatus 40 can operate the operation strap 48c, and a person behind the seat apparatus 40 can also operate the operation strap 48c. In addition, irrespective of whether the seatback 43 is disposed at the normal position P11 at the rear section of the seat or the converted position P12 at the front section of the seat, the unlocking operation is easily performed, and usability is improved. Further, the unlocking operator for the frame moving unlocked state is not limited to the operation strap 48c and, for example, may be a lever, a button, or the like.

The seat controller 160 makes the unlocking operation of the frame connecting mechanism 48 impossible and maintains the frame connecting mechanism 48 in the frame moving locked state, for example, when a driving mode of the vehicle M is manual driving.

The seat controller 160 makes the unlocking operation of the frame connecting mechanism 48 possible and can convert the frame connecting mechanism 48 to the frame moving unlocked state according to the unlocking operation when the driving mode of the vehicle M is automatic driving.

Figure 12:
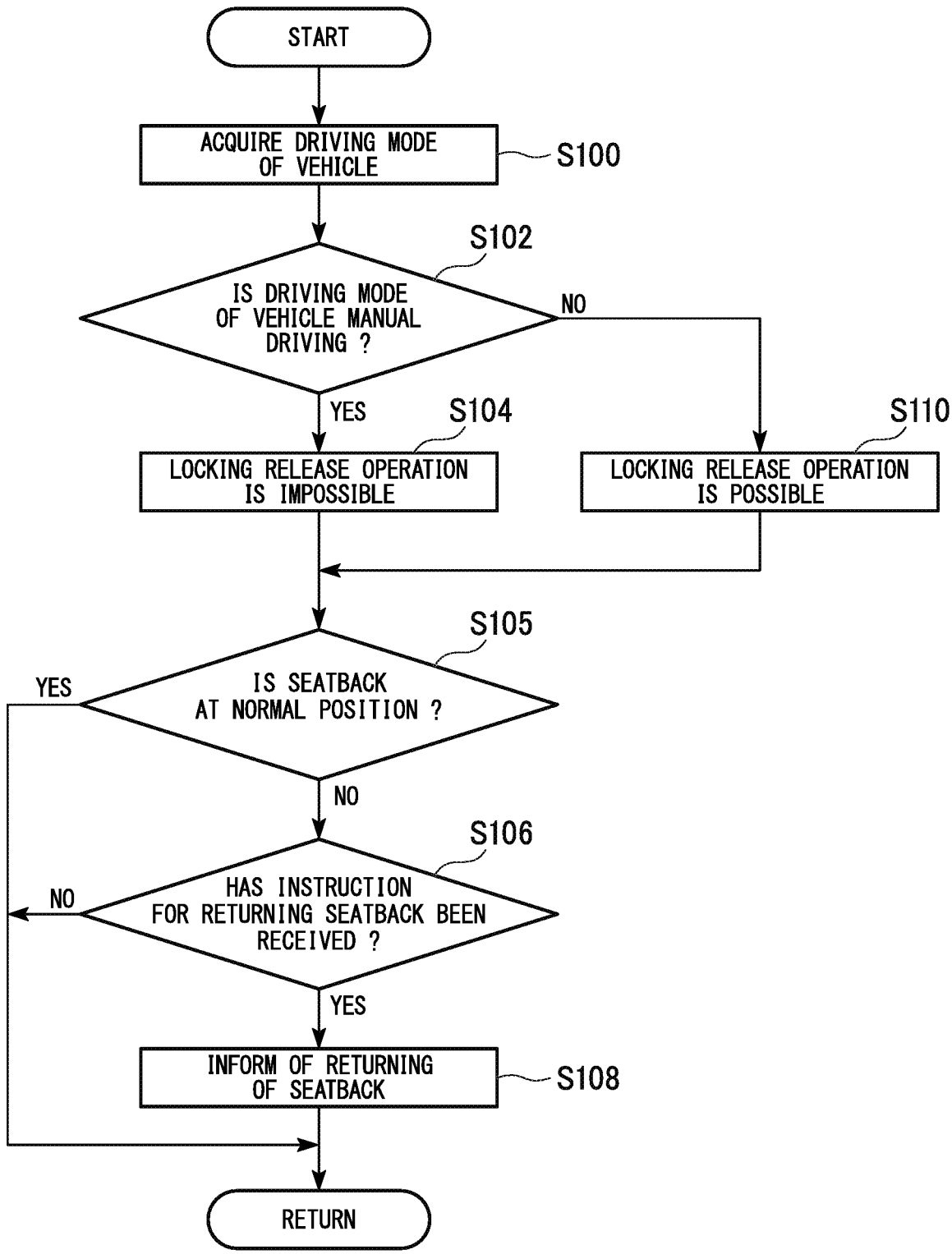
FIG. 12 is a flowchart showing main parts of the control of a seat apparatus by a seat controller.

Hereinafter, main parts of the control of the seat apparatus 40 by the seat controller 160 will be described with reference to FIG. 12. A control flow shown in FIG. 12 is repeatedly performed at predetermined intervals when the power supply is turned ON (a main switch is turned ON).

First, the seat controller 160 acquires a driving mode of the vehicle M (step S100), and determines whether the driving mode of the vehicle M is manual driving (step S102).

In step S102, when it is determined that the driving mode of the vehicle M is manual driving (in step S102, YES), the unlocking operation of the frame connecting mechanism 48 is made impossible (step S104). That is, the frame connecting mechanism 48 is maintained in the frame moving locked state.

In step S102, when it is determined when the driving mode of the vehicle M is not manual driving (in step S102, NO), the driving mode of the vehicle M is automatic driving. In this case, the unlocking operation of the frame connecting mechanism 48 becomes possible (step S110). That is, the frame connecting mechanism 48 can be converted to the frame moving unlocked state according to the unlocking operation.

After step S104 and step S110, the seat controller 160 determines whether the back support frame 45B and the seatback 43 are disposed at the normal position P11 (step S105). When it is determined that the back support frame 45B and the seatback 43 are disposed at the normal position P11 (in step S105, YES), the processing is terminated temporarily. When it is determined that the back support frame 45B and the seatback 43 are not disposed at the normal position P11 (at the converted position P12) (in step S105, NO), the processing proceeds to step S106.

In step S106, the seat controller 160 determines whether an instruction for returning the back support frame 45B and the seatback 43 to the normal position P11 (returning the seatback 43 to a forward use state) is received from the HMI 30 or the action plan generating part 123 (step S106). When an instruction for returning the back support frame 45B and the seatback 43 to the normal position P11 has not been received (in step S106, NO), the processing is terminated temporarily. When an instruction for returning the back support frame 45B and the seatback 43 to the normal position P11 has been received (in step S106, YES), for example, the seat controller 160 outputs an instruction for informing an occupant to return the back support frame 45B and the seatback 43 to the normal position P11 (returning the seatback 43 to a forward use state) (step S108), and processing of the flowchart is terminated.

According to the seat apparatus 40 of the above-mentioned embodiment, irrespective of whether the seatback 43 is moved forward or rearward to switch a sitting direction of an occupant, the seatback 43 can be reclined forward or rearward from the neutral position P13, and irrespective of whether the seatback 43 is reclined forward or rearward, the seatback 43 is biased to the neutral position P13 at which the seat back 43 stands upward. For this reason, irrespective of whether the sitting direction of the occupant is the forward direction or the rearward direction, the seatback 43 can be sufficiently reclined. In addition, irrespective of whether the sitting direction of the occupant is the forward direction or the rearward direction during unlocking of the reclining mechanism 46, since the seatback 43 is biased to the neutral position P13 at which the seatback 43 stands upward, usability when the seatback 43 is reclined can be appropriately maintained.

In addition, the reclining mechanism 46 can lock the reclining of the seatback 43 at a desired reclining angle, and unlock the reclining when the seatback 43 is further moved between a forward backrest position and a rearward backrest position.

For this reason, when the seatback 43 is moved between the forward backrest position and the rearward backrest position, without having to specifically return the seatback 43 to the neutral position P13, since the locking of the reclining of the seatback 43 is automatically released and the seatback 43 returns to the neutral position P13, an operation when the seatback 43 is moved forward and rearward to switch the sitting direction of the occupant can be easily performed.

In addition, the frame connecting mechanism 48 configured to fix the seatback 43 to the forward backrest position and the rearward backrest position, and the operation strap 48c configured to perform unlocking of the frame connecting mechanism 48 are provided, and the operation strap 48c is installed on the upper end of the seatback 43.

For this reason, irrespective of whether the sitting direction of the occupant is the forward direction or the rearward direction, the unlocking of the frame connecting mechanism 48 can be performed by the same operation to the operation strap 48c.

Further, the present invention is not limited to the embodiment, and for example, as a method of displacing the seatback, for example, a conversion mechanism using a slide mechanism or a feed screw mechanism may be provided. The present invention is not limited to an application to an automatic driving vehicle and may be generally applied to a seat apparatus for a vehicle capable of horizontally rotating a seat main body.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A seat apparatus for a vehicle comprising:
a seat cushion;
a seatback standing upward from the seat cushion and that supports a back of a person sitting on the seat cushion;
a conversion mechanism that converts a disposition of the seatback between a normal position to a converted position, the normal position being a position at which the seatback is disposed at a rear section of the seat cushion and a sitting direction of an occupant is facing forward, the converted position being a position at which the seatback is disposed at a front section of the seat cushion and a sitting direction of an occupant is facing rearward; and
a reclining mechanism that biases the seatback toward a neutral position at which the seatback stands upward and that reclines the seatback forward and rearward from the neutral position,
wherein the reclining mechanism comprises:
a reclining shaft that is provided at a lower end of the seatback and that is a shaft about which the seatback is reclined forward and rearward from the neutral position, and
a biasing member disposed in a radial direction of the reclining shaft when the seatback is disposed at the neutral position,
a first end of the biasing member is engaged with an eccentric section of the seatback separated from the reclining shaft and a second end of the biasing member is engaged with a non-reclining member that reclinably support the seatback, and
the biasing member elongates when the seatback is reclined forward or rearward from the neutral position to accumulate a biasing force.

2. The seat apparatus for a vehicle according to claim 1, wherein the reclining mechanism is able to adjust a reclining angle of the seatback and to lock the reclining of the seatback at the adjusted reclining angle, and
the reclining mechanism is further able to unlock the reclining when the seatback moves between the normal position and the converted position.

3. The seat apparatus for a vehicle according to claim 1, further comprising: a locking mechanism that fix the seatback at the normal position and the converted position, and an unlocking operator that performs an unlocking operation of the locking mechanism,
wherein the unlocking operator is installed on an upper end of the seatback.

4. A seat apparatus for a vehicle comprising:
a seat cushion;
a seatback standing upward from the seat cushion and that supports a back of a person sitting on the seat cushion;
a conversion mechanism that converts a disposition of the seatback between a normal position to a converted position, the normal position being a position at which the seatback is disposed at a rear section of the seat cushion and a sitting direction of an occupant is facing forward, the converted position being a position at which the seatback is disposed at a front section of the seat cushion and a sitting direction of an occupant is facing rearward; and
a reclining mechanism that biases the seatback toward a neutral position at which the seatback stands upward and that reclines the seatback forward and rearward from the neutral position,
wherein the reclining mechanism comprises:
a reclining shaft that is provided at a lower end of the seatback and that is a shaft about which the seatback is reclined forward and rearward from the neutral position, and
a biasing member that comprises a first spiral spring and a second spiral spring that apply biasing forces to the seatback in opposite directions with each other, and
the first spiral spring and second spiral spring bias the seatback toward the neutral position, and accumulate a biasing force in only one of the first spiral spring and second spiral spring when the seatback is reclined forward or rearward from the neutral position.

5. The seat apparatus for a vehicle according to claim 4, wherein the reclining mechanism is able to adjust a reclining angle of the seatback and to lock the reclining of the seatback at the adjusted reclining angle, and the reclining mechanism is further able to unlock the reclining when the seatback moves between the normal position and the converted position.

6. The seat apparatus for a vehicle according to claim 4, further comprising: a locking mechanism that fix the seatback at the normal position and the converted position, and an unlocking operator that performs an unlocking operation of the locking mechanism, wherein the unlocking operator is installed on an upper end of the seatback.

* * * * *